Nov. 27, 1951     W. R. MORBY     2,576,629
LINE MEASURING METER
Filed Sept. 27, 1946
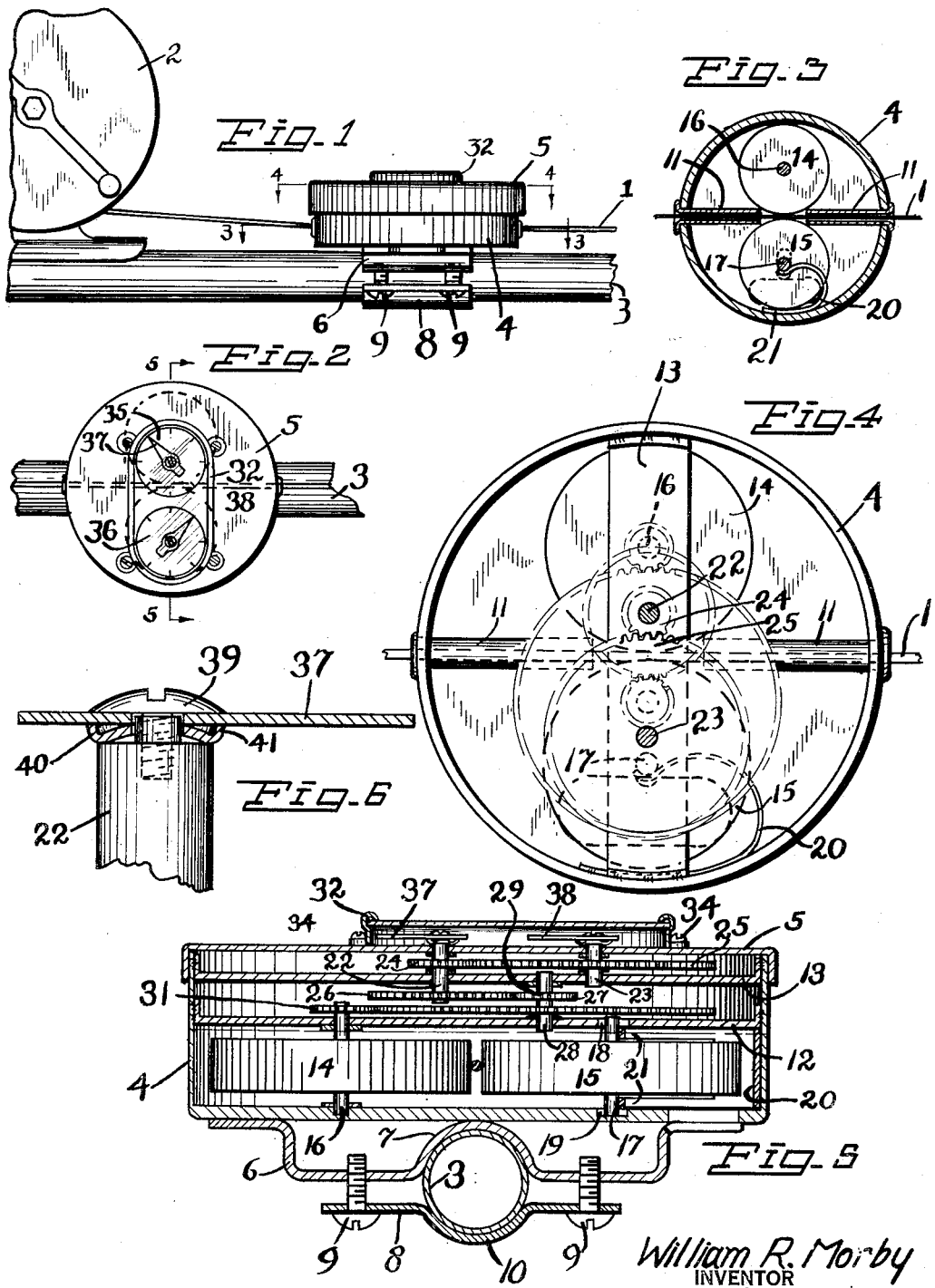
William R. Morby
INVENTOR
BY *Glenn S. Fish*
ATTORNEY Patented Nov. 27, 1951

2,576,629

UNITED STATES PATENT OFFICE 2,576,629

LINE MEASURING METER

William R. Morby, Millwood, Wash.

Application September 27, 1946, Serial No. 699,933

1 Claim. (Cl. 33—134)

This invention relates to a meter or measuring device which is intended for use in connection with a fishing line, it being one object of the invention to provide a device which may be applied to a fishing rod and serve very effectively to indicate the length of line which is used while fishing. It will thus be seen that a fisherman having a meter of the improved construction mounted upon his rod may accurately determine the length of line which has been unreeled and thus know whether sufficient line is in use to catch fish which feed at approximately a certain number of feet below the surface of water.

Another object of the invention is to provide a meter or measuring device which is of small and compact construction and may be mounted upon a fishing rod without appreciably adding to the weight of the rod or making it difficult to cast with the rod.

Another object of the invention is to provide a measuring device wherein the line passes between rollers, one roller being spring pressed towards the other so that as the line is unreeled and passes between the rollers the second roller will be turned and a train of gears actuated to cause indicating hands or pointers to turn over dials and thus indicate the length of line which has been unwound from a reel.

Another object of the invention is to provide a measuring device having its indicating hands or pointers so mounted upon shafts carrying the hands that while the hands will be normally turned with the shafts they may be manually turned relative to the shafts and thus set when necessary.

The invention is illustrated in the accompanying drawings wherein:

Fig. 1 is a side view showing the improved meter mounted upon a fishing rod.

Fig. 2 is a top plan view of the meter and a portion of the rod.

Fig. 3 is a sectional view taken through the meter along the line 3—3 of Figure 1.

Fig. 4 is a view taken along the line 4—4 of Figure 1 and showing the cover for the meter housing removed.

Fig. 5 is a transverse sectional view taken along the line 5—5 of Figure 2.

Fig. 6 is a fragmentary view showing the manner in which a hand or pointer is mounted upon the shaft carrying the same.

This meter or measuring device is used for measuring the length of fishing line 1 which is unwound from a reel 2 and is mounted upon the fish rod 3 in front of the reel so that line unwound from the reel will pass through the measuring device and be measured.

The meter or measuring device has a housing 4 which may be formed of sheet metal, or other suitable material, and provided with a removable cover 5. A bracket 6 is mounted across the bottom of the housing diametrically thereof and for the major portion of its length is spaced from the housing. Midway its length the strip of metal from which the bracket is formed is bent to form a seat 7 to receive a portion of the rod 3. Therefore the bracket constitutes a stationary jaw of a clamp with which cooperates a movable jaw 8 which is connected with the stationary jaw by screws 9 and bent to form a recess 10 into which the rod fits. From an inspection of Figure 5 it will be seen that when the screws are tightened the jaw 8 will be moved toward the jaw or bracket 6 and the housing firmly secured upon the rod in desired spaced relation to the reel. Tubes or sleeves 11 which are mounted through front and rear portions of the annular wall of the housing in alignment with each other guide the line through the housing.

Within the housing is a bridge or strip 12 which extends transversely of the tubes 11 and over this bridge is a second bridge or strip 13 spaced upwardly from bridge 12. Rollers 14 and 15 are disposed in side by side relation to each other between the bridge 12 and the bottom of the housing 4 and have shafts or axles 16 and 17 which are rotatably engaged with the bottom of the housing and rotatably mounted through the bridge 12. The shaft 17 of roller 15 is received in slots 18 and 19 formed in the bridge and the bottom of the housing and this allows roller 15 to be shifted toward and away from roller 14. A spring 20 formed from a strip of resilient metal is secured against the inner surface of the annular wall of the housing and extends circumferentially of the housing, the free end portion of the spring strip being bent to form arms 21 and being bent in a curve back upon itself so that the spring arms 21 will engage across the shaft 17 above and below roller 15 and cause roller 15 to be pressed toward roller 14. Therefore as the line 1 is moved longitudinally through the tubes 11 its portion passing between the rollers will cause roller 14 to be turned. The fact that the roller 15 is yieldably held toward the roller 14 also allows the measuring device to accommodate lines of various thicknesses which are used according to the type of fish which it is desired to catch.

Above the bridge 12 is a train of gearing and referring to Figure 5 it will be seen that shafts 22 and 23 of this gearing are rotatably mounted through the upper bridge or strip 13. Above the strip 13 shaft 22 carries a small gear 24 meshing with a large gear 25 carried by shaft 23 and below the strip 13 the shaft 22 carries a gear 26 which meshes with a smaller gear 27 carried by a countershaft 28. This shaft 28 is rotatably mounted through the strips 12 and 13 and carries gears 29 and 27, the gear 30 being in mesh with a small gear 31 mounted upon the shaft 16 of the roller 14. By using this arrangement of gears rotary motion at a reduced speed will be transmitted to the shafts 22 and 23, ten rotations of the shaft 22 being required for one rotation of the shaft 23. An elongated casing 32 provided with a transparent top is mounted upon the cover diametrically thereof and removably secured by screws 34 so that it may be removed when necessary and defines a chamber into which upper ends of the shafts 22 and 23 project. Dials 35 and 36 are marked or otherwise provided upon the cover within the casing 32 and the shafts carry at their upper ends hands or pointers 37 and 38 which turn with the shafts. A complete turning of the pointer 37 indicates that ten feet of line have been unwound from the reel 2 and a complete turning of the pointer 38 indicates that one hundred feet of line have been unwound. It will thus be seen that when a rod equipped with the improved measuring device is in use the fisherman can accurately determine how much line has been unwound from the reel and thus ascertain whether he is fishing at the proper depth.

The hands or pointers are mounted upon the shafts 22 and 23 as shown in Figure 6, and referring to this figure it will be seen that each hand is formed with an opening to receive a screw 39. The screw engages in a threaded socket formed in the shaft and about the screw is mounted a resilient washer 40 which is of concaved convexed formation and has its marginal portion bent upwardly to form a flange 41 which bears against the under face of the hand or pointer. When the screw is tightened sufficient pressure will be exerted by the washer to cause the hand to turn with the shaft but when the casing 32 is removed a finger may be applied to the hands for turning them about the shafts and moving them to a set position which will dispose them at the zero marks of the dials when the line has been threaded along a rod of a certain length to the outer or tip end of the rod. Therefore the measuring device may be adjusted to accommodate it to rods of different lengths and the length of line actually cast from a rod.

Having thus described the invention, what is claimed is:

A line measuring meter comprising a housing having an annular bottom and a wall about the periphery thereof, aligned tubes extending transversely in said housing diametrically thereof and having outer ends rigidly mounted through opposite portions of the wall and inner ends spaced from each other and constituting line guides, upper and lower strips in said housing extending diametrically thereof and transversely of said tubes above space between inner ends of the tubes in vertically spaced parallel relation to each other and having ears at their ends rigidly secured to portions of the wall and constituting bridges rollers in said housing between the lower bridge and the bottom of the housing and located at opposite sides of the tubes and having portions entering space between inner ends of the tubes and disposed in close proximity to each other for gripping a line between them, said rollers having vertical shafts rotatably engaged with the bottom of the housing and the lower bridge and having their upper ends projecting into space between the bridges, the shaft of one roller being slidable towards and away from the shaft of the other roller as well as being rotatably mounted and urged towards the second roller, a small gear carried by the upper end of the shaft of one roller, a vertical counter shaft rotatably mounted between said bridges and carrying a large gear meshing with the small gear, said counter shaft also carrying a small gear above the large gear, a cover for said housing, shafts rotatably mounted through the cover and the upper bridge and being connected by gears between the cover and the upper bridge, one of the last mentioned shafts extending into the space between the bridges and carrying a large gear meshing with the small gear of the countershaft, and pointers carried by upper end of the last mentioned shafts above the cover and cooperating with dials upon the cover for indicating the length of line moving longitudinally through the tubes and between the rollers in turning engagement with the rollers.

WILLIAM R. MORBY.

REFERENCES CITED

The following references are of record in the file of this patent:

UNITED STATES PATENTS

| Number | Name | Date |
| --- | --- | --- |
| 68,245 | Shinn | Aug. 27, 1867 |
| 566,909 | Hoffman | Sept. 1, 1896 |
| 886,224 | Laufer | Apr. 82, 1908 |
| 898,308 | Broadwater | Sept. 8, 1908 |
| 947,580 | Rich | Jan. 25, 1910 |
| 1,223,955 | Gant | Apr. 24, 1917 |
| 1,504,055 | Kiff | Aug. 5, 1924 |
| 2,163,402 | Mason | June 20, 1939 |

FOREIGN PATENTS

| Number | Country | Date |
| --- | --- | --- |
| 573,747 | Germany | Apr. 5, 1933 |